Aug. 1, 1961 — A. F. MILLINGTON — 2,994,210
EVAPORATOR STRUCTURE
Filed May 19, 1958 — 3 Sheets-Sheet 1
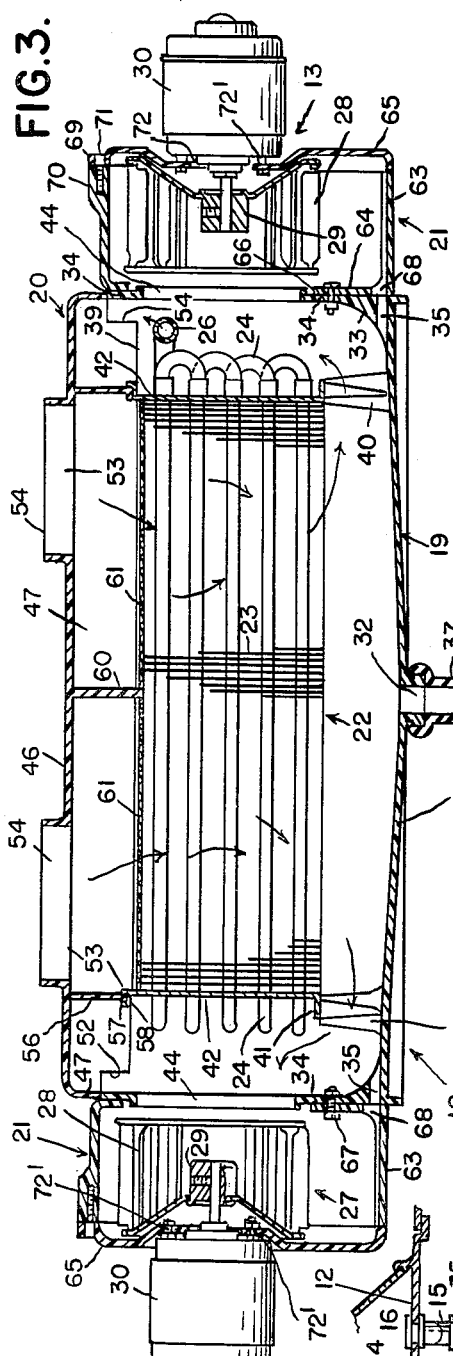
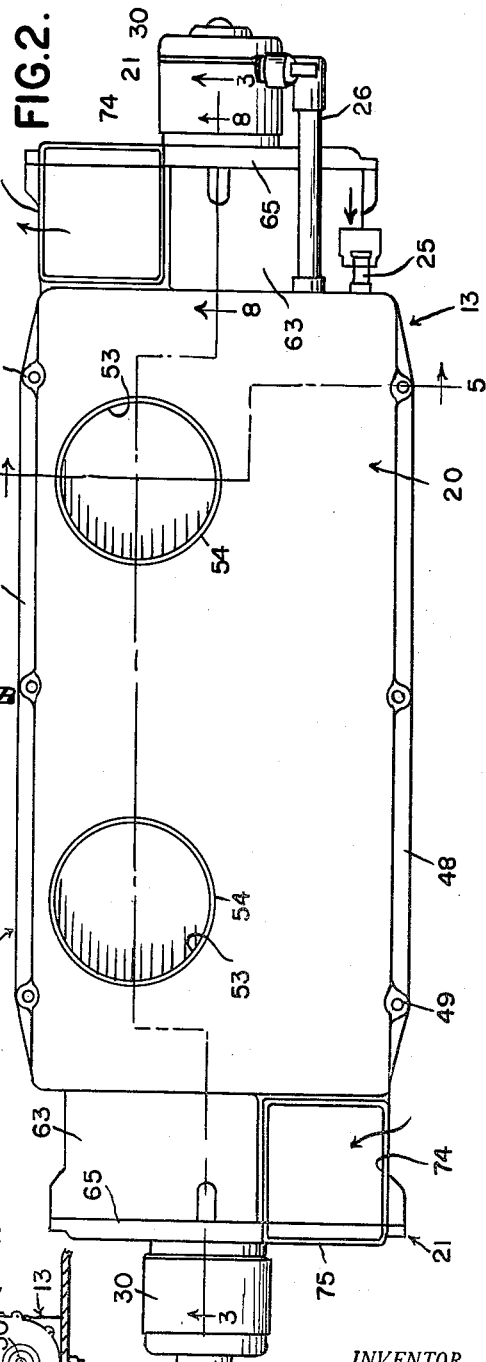
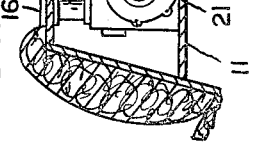
INVENTOR.
ALFRED F. MILLINGTON
BY Whittemore, Hulbert & Belknap
ATTORNEYS Aug. 1, 1961 A. F. MILLINGTON 2,994,210
EVAPORATOR STRUCTURE
Filed May 19, 1958 3 Sheets-Sheet 2
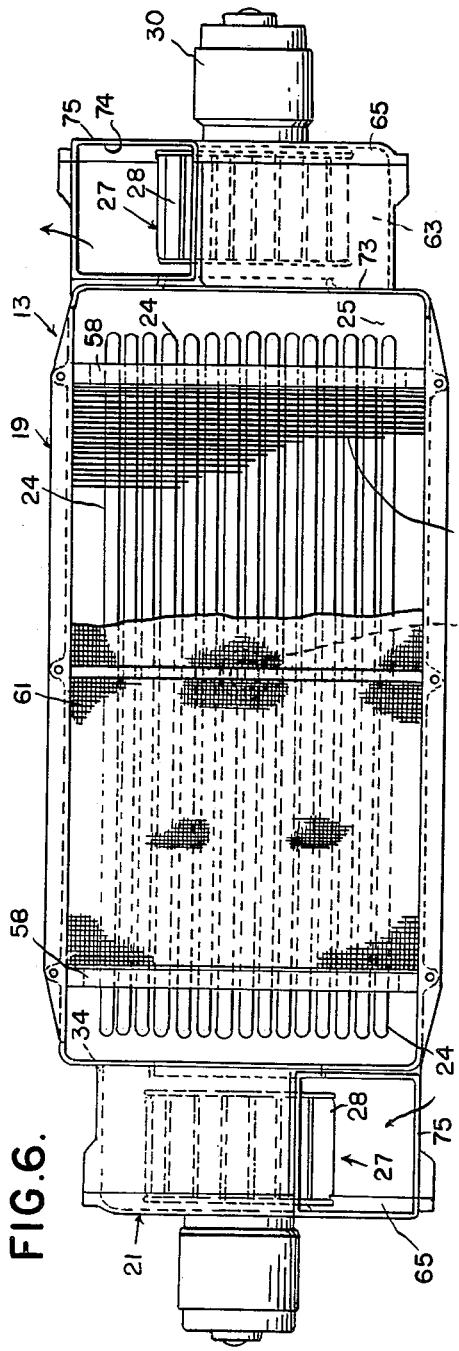
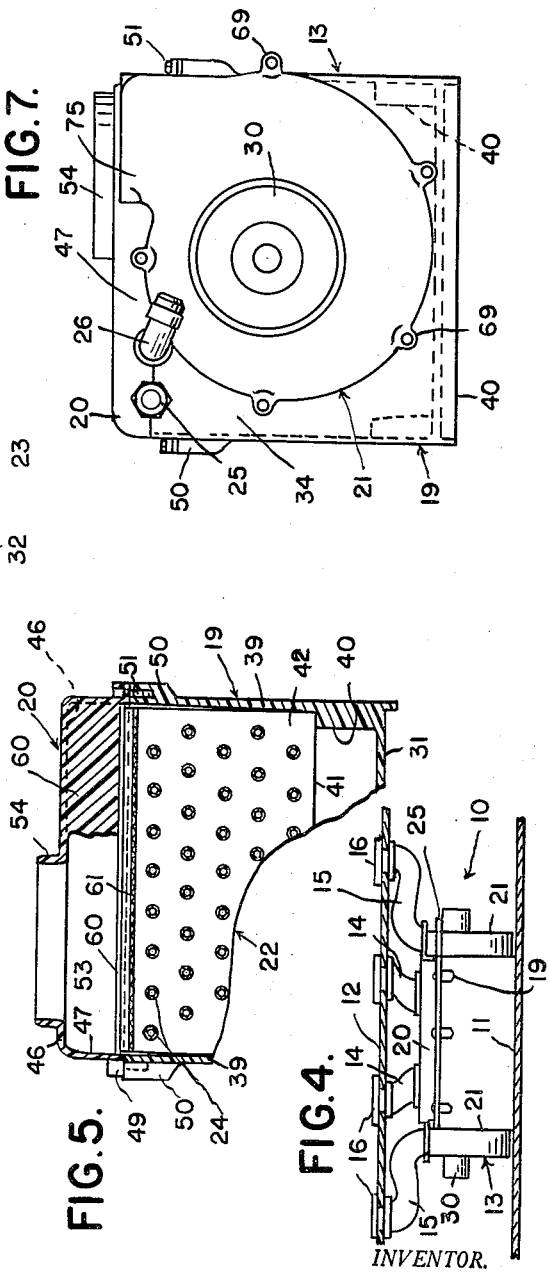
INVENTOR.
ALFRED F. MILLINGTON
BY
Whittemore, Hulbert & Belknap
ATTORNEYS Aug. 1, 1961     A. F. MILLINGTON     2,994,210
EVAPORATOR STRUCTURE
Filed May 19, 1958            3 Sheets-Sheet 3
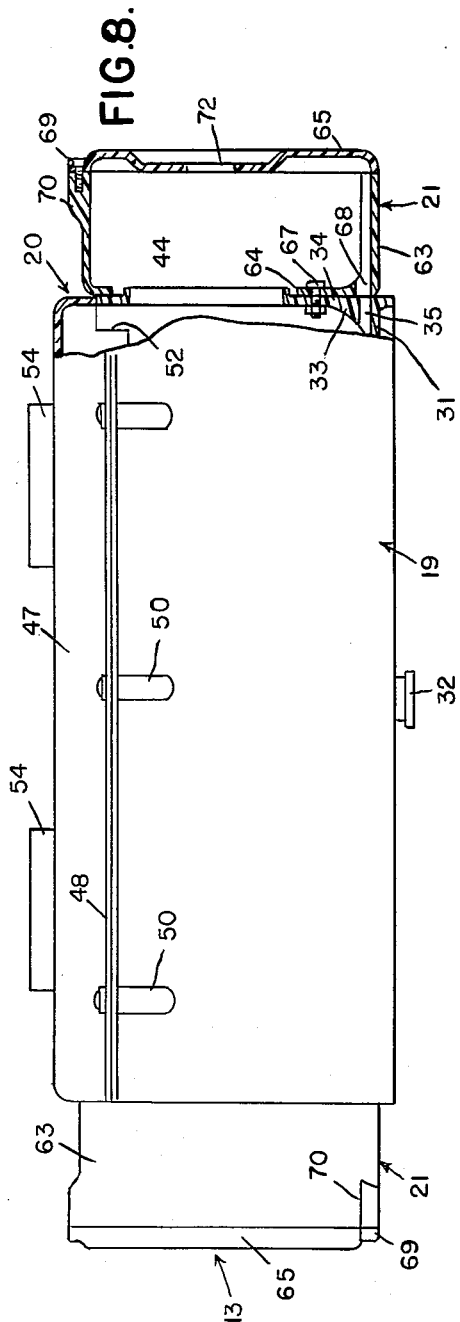
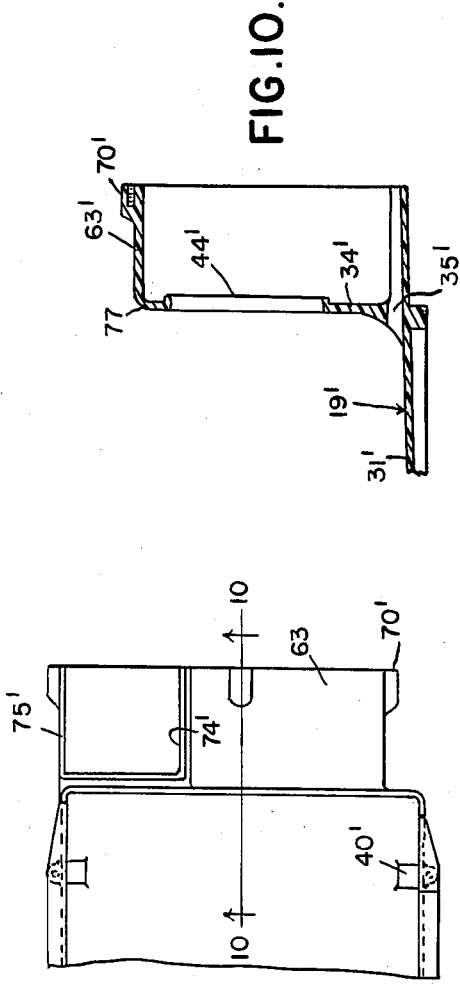
INVENTOR.
ALFRED F. MILLINGTON
BY
*Whittemore, Hulbert & Belknap*
ATTORNEYS

United States Patent Office 2,994,210
Patented Aug. 1, 1961

2,994,210
EVAPORATOR STRUCTURE
Alfred F. Millington, Northville, Mich., assignor to Novi Equipment Company, Novi, Mich., a corporation of Michigan
Filed May 19, 1958, Ser. No. 736,052
15 Claims. (Cl. 62—244)

The present invention relates to an improved housing structure for the evaporator of an automotive air conditioning system; and more particularly to an evaporator housing which is installed in the rear deck or trunk compartment of a vehicle, with the air inlet and outlet ducts of the evaporator communicated upwardly through the usual rear window package tray or shelf of the vehicle body.

It is a general object of the invention to provide evaporator housing structure of this sort which is fabricated of a suitable plastic material to provide a one-piece housing body having blower housing units (preferably also of molded plastic construction) associated at its ends and in communication therewith. This eliminates the need for the usual separate drain pan of conventional evaporators, as well as separate thermal insulation provisions, which have been extensive in previous generally comparable structures. Other advantages of the improved construction reside in the fact that it eliminates the need for extensive soldered connections or spot welding, and for degreasing and painting, as well as for the cementing of insulation in place.

Another object is to provide an anti-rust type plastic evaporator housing as described, in which provision is made to flow the condensate to a single outlet from a housing body proper and a pair of blower housing units associated therewith.

A still further object is to provide evaporator housing structure which is light in weight though rugged, hence is easily handled during and after assembly of its component parts, and is in general rendered easier and more economical to manufacture by reason of the above mentioned improved attributes.

A more specific object is to provide an evaporator including housing structure as described combined with evaporator coil, finned core and blower components housed therein to provide a strong and rugged bracing of the housing parts, as well as to fully encase and protect the operating components. More particularly, a molded housing cover which is applied to the housing body is ribbed in a way to rest on the finned evaporator core and be braced by the latter, as well as to coact with the end plates of the core in laterally confining the flow of air past the evaporator coil.

Another specific object is to provide an evaporator housing having a body affording an integral condensate drain pan as described, and with end blower housing units in communication with the drain pan through end walls of the body, for a direct flow of condensate to a single outlet.

In accordance with a further specific object, the housing cover has upward air inlet openings adapted to be communicated through the vehicle package tray, which openings are offset from a longitudinal center line of the cover, with symmetrically arranged means to connect the cover to the housing body. Thus the cover may be reversed, front-to-rear and vice-versa, to facilitate the making of duct connections to the package tray, as well as to accommodate torsion bars and the like in the deck space.

The foregoing as well as other objects will become more apparent as this description proceeds, especially when considered in connection with the accompanying drawings illustrating preferred embodiments of the invention, wherein:

FIG. 1 is a fragmentary view in vertical section longitudinally of an air conditioned vehicle body served by an evaporator having the housing structure of the invention, the view generally showing the intended rear deck mount thereof and its inlet and outlet connections;

FIG. 2 is a top plan view of the evaporator;

FIG. 3 is a view in vertical longitudinal section along broken line 3—3 of FIG. 2, showing evaporator coil, core and blower components as assembled to the improved housing structure;

FIG. 4 is a fragmentary view in rear elevation of the evaporator as mounted in the automobile's rear deck space;

FIG. 5 is a fragmentary view in transverse vertical section along broken line 5—5 of FIG. 2, showing housing provisions for bracing its separable cover and body parts in relation to one another and the evaporator core;

FIG. 6 is a top plan view, partially broken away, of the housing with its cover removed;

FIG. 7 is an end elevational view of the evaporator, as from the right of FIG. 2;

FIG. 8 is a rear elevational view of the assembled housing structure alone, being partially broken away and vertically sectioned upon a line corresponding to line 8—8 of FIG. 2;

FIG. 9 is a fragmentary top plan view of a modified housing structure according to the invention, in which the housing body has blower housing means molded integrally therewith; and FIG. 10 is a fragmentary view in vertical section on line 10—10 of Fig. 9.

Referring first to FIGS. 1 and 4 of the drawings, schematically showing the arrangement of the evaporator as a whole at the rear of the passenger compartment of an automobile, the evaporator, generally designated 10, is suitably mounted fixedly to and supported by the rear compartment deck 11, beneath the usual package tray 12 which is immediately in front of the rear window. The housing structure in accordance with the invention, generally designated 13, has its inlet and outlet fittings (hereinafter described) suitably connected by flexible hoses or like conduits 14, 15, respectively, to grill type fittings 16 which open through the package tray 12.

The housing structure 13, in the embodiment of the invention shown in FIGS. 1 through 8, has four main component parts, each preferably molded in its entirety of a suitable synthetic plastic material such as acrylonitrile, capable of affording desired rigidity when assembled, although, as molded, not entirely inflexible.

The four major housing components referred to above are a housing body proper 19 of rectangular, vertical walled outline, an internally ribbed cover 20, and a pair of like blower housing units 21 fixedly applied to opposite ends of the housing body 19. The reference numeral 22 generally designates a conventional rectangular coil core housed within the body 19, including a multiplicity of conventional, closely spaced fins 23 supporting coil tubing 24 in the usual manner. As shown in FIGS. 2, 6 and 7, the coil 24 terminates in an inlet connection 25 from the expansion valve of the system (not shown), and an outlet connection 26 to the suction line of the compressor (also not shown). In these features the evaporator is entirely conventional.

Referring to FIGS. 3 and 6, the reference numeral 27 designates a sirocco type blower, there being one of these received in each of the blower housing units 21; and the wheel 28 of such blower has its hub 29 secured on a shaft of an appropriately rated electrical drive motor 30, which is mounted to the blower housing unit 21 in a manner to be described. Blower housing units 21 are of identical design to receive identical standard blowers 27, being for this reason reversed in their application to opposite ends of housing body 19.

As shown in FIGS. 3, 5 and 8, the housing body 19 is molded to provide a floor 31 mildly inclined from its opposite ends (as viewed in FIG. 3) to provide an integral condensate receiving pan which drains to an outlet fitting 32 located at the center thereof. At its opposite elevated ends the housing body 19 is molded in an increased thickness 33 at the end junctions of its condensate pan 31 with its upright end walls 34, and a drain opening 35 extends through each of these thickened portions 33 to the exterior of housing body 19, where it is in communication with the interior of a blower housing unit 21, as will be hereinafter described in greater detail.

It is thus seen that condensate from the evaporator core 22 and the blading of blower wheels 28 drains readily from the blower housing units 21 onto the integral water pan 31, thence to the single outlet drain fitting 32, whence it is conducted through a suitable rubber connector to 37 to discharge beneath the deck 11 of the automobile.

At four points spaced inwardly from its opposite end walls 34, and preferably as integral formations on the bottom of its opposed front and rear walls 39, the housing body 19 is provided with inwardly projecting, upright locating abutments or posts 40. These are so disposed as to support the core unit 22, the latter being provided with outwardly extending bottom flanges 41 on its opposed end plates 42 which rest on the posts 40. The end plates 42 also serve as intermediate supports for the evaporator housing cover 20, in a manner to be described.

Each of the opposite end walls 34 of housing body 19 is provided, adjacent the top thereof, with a central air outlet opening or passage 44 to the adjacent blower housing unit 21.

The housing cover 20 corresponds in its rectangular outline to that of the housing body 19, including a flat upper panel portion 46 and a peripheral down-turned wall 47 integral therewith. The edge of the wall rests, at opposite ends of cover 20, upon the upper edge of housing body 19, as illustrated in FIGS. 3, 5 and 7, when the cover is assembled to the body and secured thereto. For the purpose of such securement, cover wall 47 is provided with outwardly projecting integral flanges 48 along its front and rear bottom margins, and external bosses 49 are provided in spaced relation to one another on these flanges. Bosses 49 are in vertically registered relation to corresponding integral, outwardly projecting bosses 50 on the outwardly flanged front and rear walls 39 of housing body 19, and suitable screws 51 are threaded into the pairs of mating bosses 49 and 50 to hold the cover 20 in place.

It is also to be noted, by reference to FIGS. 3 and 8, that the end and side walls of cover 20 are rectangularly recessed at their corners, as indicated by the numeral 52, for matching engagement with the corners of housing body 19, thus facilitating and expediting assembly.

The top panel 46 of housing cover 20 is provided with a pair of air inlet or intake openings 53 (FIGS. 2 and 3) each surrounded by a circular, upwardly extending flange or wall 54 to which one of inlet air hoses or conduits 14 is to be attached, in the fashion shown in FIGS. 1 and 4. As best shown in FIGS. 2 and 5, these openings are offset laterally to one side of the vertical center plane of housing 13 running from end to end thereof. Otherwise, all features of the cover 20 are symmetrically arranged relative thereto.

The purpose of this is to enable the housing cover 20 to be reversed front-to-rear or vice versa, as desired, and thereby best accommodate the mounting of the hoses or ducts 14 which lead from the evaporator to the package rack 12. The reversability also makes it possible to avoid interference with torsion bars or other structure extending through the deck or trunk compartment.

Referring to FIG. 3 of the drawings, housing cover 20 is provided with a pair of integral, downwardly projecting ribs 56 extending from the front to rear of its wall 47, in equal inward spacing from its ends. These ribs are adapted to engage along elongated rubber sealing strips 57 applied along the respective upturned top flanges 58 of the end plates 42 of core unit 22. The flow of air from inlet openings 54 through the core unit at the ends of the latter, as indicated by arrows in FIG. 3, is thereby confined by the ribs 56 and core end plates 42.

Furthermore, the housing cover 20 is provided with an integral downwardly projecting rib 60 at its longitudinal center, this rib extending from front to rear of the cover wall 47 which it integrally joins. As shown in FIGS. 3 and 5 the rib 60 rests on the top of the closely spaced fins 23 of core 22, thus affording a further rigidifying and bracing support for cover 20. Rib 60 also serves to separate from one another a pair of thin, Saran type filter elements 61 which rest upon the top of the core, and to direct the flow of air from inlet openings 53 into the core.

Thus it is seen that air entering the housing 13 from inlet openings 53 has a smooth, non-turbulent flow through the respective filters 61 and core 22, then underneath the opposite end plates 42 of the latter to the respective outlet openings 44 to the blower housing units 21, as indicated by arrows in FIG. 3.

The housing units 21 are identical in design for standardization of the same for identical motors 30 and blowers 27. Therefore they are mounted to the respective end walls 34 of housing body 19 in reversed relation thereto, as shown in FIGS. 2 and 6. Each blower housing unit 21 comprises a hollow annular, generally cuplike casing member 63 which is, like body 19 and cover 20, molded of plastic material, with an inner upright wall 64 of member 63 in end abutting engagement with the adjacent end wall 34 of housing body 19; and a molded cover plate 65 of annular, dished sectional outline.

Casing member 63 has a circular aperture 66 which concentrically surrounds the air outlet opening 44 of housing body 19 when the unit 21 is operatively applied to the latter, being secured to its wall 34 by a series of screws or bolts 67, as shown in FIGS. 1 and 8. Each casing member 63 also has a drain opening 68 formed through the bottom of its upright inner wall, in end-aligned communication with the drain opening 35 of the adjacent housing body wall 34. Thus there is an unimpeded condensate drain flow from the blower unit to drain pan 31.

As shown in FIGS. 3, 6 and 7, the cover plate 65 of each blower housing unit 21 is contoured to correspond with the adjacent end of its casing member 63. It is molded in a shallow, dished cross section, being provided with a series of external bosses 69 around its outer end margin. These match with corresponding bosses 70 on casing member 63, for the reception of screws 71 which hold the cover plate to the casing member.

As so secured, an opening 72 of cover plate 65 is disposed coaxially of the air discharge or outlet opening 44 of housing body 19 for the reception of the shaft of motor 30. The motor is appropriately secured to cover plate 65, as by the mounting bolts 72' (FIG. 3) at points spaced around the opening 72.

With the core unit 22 mounted in housing 19 as described, its inlet fitting 25 from the expansion valve (not shown) and its outlet fitting 26 to the compressor (not shown) extend outwardly through one end of the housing, at the joint between cover 20 and body 19; and the wall 47 of the former and wall 34 of the latter are provided with pairs of suitable notches 73 at their end meeting edges (see FIG. 6) to accommodate these fittings. It is to be understood that the unused pair of these notches is plugged.

As appears in FIGS. 2, 6 and 7, the mated casing member 63 and cover plate 65 of each blower housing unit 21 are formed to provide an upwardly facing air outlet opening 74 of rectangular outline, defined by upstanding wall portions 75 of these two members. The opening 74 of one of the blower housing units 21 is disposed toward the front of the housing 19, and at the opposite end its is located toward the rear. The hoses or conduits 15 connect these outlets through the package rack 12, as shown in FIGS. 1 and 4.

FIGS. 9 and 10 of the drawings illustrate a modified adaptation of the invention, in which the core-receiving housing body, here generally designated 19' and the impeller casing member, generally designated 63' (having functions identical to those of the body 19 and casing member 63, respectively), are molded as a single, integral unit, thereby facilitating and expediting the assembly of the evaporator as a whole. A single central drain opening 35' communicates the interior of casing portion 63' to the body 19'; and the molded member of FIGS. 9 and 10 is also provided with an offset upper shoulder at 77, upon which the cover member 20 will rest, being secured to housing body 19' in the manner described in connection with FIGS. 1 through 8.

All other elements and relationships shown in FIGS. 9 and 10 correspond to those shown in the other figures, hence are identified by corresponding reference numerals, primed, and further description is dispensed with.

The invention provides an evaporator having an improved core and blower housing structure of all molded plastic composition, eliminating the need for separate thermal insulation, a separate drain pan, and the heretofore necessary operations of soldering, spot welding, degreasing, painting, cementing and the like. The housing is proof against rusting and is very inexpensively manufactured and assembled.

Its integral drain pan and communicating condensate drainage openings from the blower housing units provides a rapid ridding of condensate to a single outlet opening. Its ribbed cover construction gives desired strength and rigidity in a structure which is not, in regard to the plastic material of which it is fabricated, inherently extremely rigid. A well controlled flow of air is insured from the inlet openings through the evaporator coil and core to the blower housing and out of the latter to the space to be air conditioned. Hence blower motors of light rating can be employed.

Furthermore, the housing is universal in regard to its adaptability to accommodate hose connections and possible interference with other mechanism within a trunk deck spacing, by simply reversing the application of the housing cover and thereby shifting the air inlet openings from its front zone to its rear, or vice versa.

What I claim as my invention is:

1. Evaporator housing structure for an automobile air conditioning or like system, comprising an elongated, generally rectangular housing body adapted to receive an evaporator coil and core unit, and a cover mounted on said housing body, said cover being of a molded plastic composition, having a top panel provided with a downwardly extending peripheral wall and being provided with an integral formation within said wall depending from said top panel and positioned for bracing engagement with said coil and core unit, said cover having an upwardly facing air intake opening to the interior of said housing body, which opening is located in offset relation to the end-to-end center line of the cover, thereby to variably position said opening relative to the body when said cover is reversed in its mount on said body.

2. Evaporator housing structure for an automobile air conditioning or like system, which structure comprises a housing body of elongated rectangular outline adapted to receive an evaporator coil and core unit of the system, a blower housing unit adapted to receive a blower, and a housing cover mounted on said housing body, said housing body having an integral drain pan therebeneath extending from wall to wall thereof, said blower housing unit and said body being separated by an upright wall structure, through an opening in which wall structure the body and unit have air circulating communication, and being in condensate draining communication with one another through a further opening in said wall structure at the level of said drain pan, said cover being provided with an integral rib formation positioned for bracing engagement from above with said coil and core unit, said cover having an upwardly facing air intake opening to the interior of said housing body.

3. Evaporator housing structure for an automobile air conditioning or like system, which structure comprises a housing body of elongated rectangular outline adapted to receive an evaporator coil and core unit of the system, a blower housing unit adapted to receive a blower, and a housing cover mounted on said housing body, said housing body having an integral drain pan therebeneath extending from wall to wall thereof, said blower housing unit having an upright wall and means to secure said wall in engagement with an end wall of said housing body, said body and unit being in condensate draining communication with one another through a further opening in said walls at the level of said drain pan, said cover being provided with an integral rib formation positioned for bracing engagement from above with said coil and core unit, said cover having an upwardly facing air intake opening to the interior of said housing body.

4. Evaporator housing structure for an automobile air conditioning or like system, which structure comprises a housing body of elongated rectangular outline adapted to receive an evaporator coil and core unit of the system, a blower housing unit adapted to receive a blower, and a housing cover mounted on said housing body, said housing body having an integral drain pan therebeneath extending from wall to wall thereof, said blower housing unit and said body being separated by an upright wall structure molded integral therewith, through an opening in which wall structure the body and unit have air circulating communication, and being in condensate draining communication with one another through a further opening in said wall structure at the level of said drain pan, said cover being provided with an integral rib formation positioned for bracing engagement from above with said coil and core unit, said cover having an upwardly facing air intake opening to the interior of said housing body.

5. Evaporator housing structure for an automobile air conditioning or like system, which structure is molded substantially in its entirety, as to its housing components, of a molded plastic material and comprises a housing body of elongated rectangular outline adapted to receive an evaporator coil and core unit of the system, a pair of blower housing units each adapted to receive a blower, and a housing cover mounted on said housing body, said housing body having an integral drain pan therebeneath extending from wall to wall thereof, each blower housing unit and said body being separated by an upright wall structure, through an opening in which wall structure the body and unit have air circulating communication, and being in condensate draining communication with one another through a further opening in said wall structure at the level of said drain pan, said cover being provided with an integral rib formation positioned for bracing engagement from above with said coil and core unit, said cover having an upwardly facing air intake opening to the interior of said housing body, which intake opening is located in offset relation to the end-to-end center line of the cover, thereby to variably position said air intake opening relative to the body when said cover is reversed in its mount on said body.

6. Housing structure for the evaporator of an automotive air conditioner or the like, comprising parts fabricated of molded plastic material and coacting to receive a coil unit of said evaporator, said parts including a housing body part having walls within which said coil unit is to be disposed, and a further part having walls marginally fitted to said body part and, within said last named walls, an integral formation which is predeterminedly positioned to engage said coil unit medially and in inwardly spaced relation to said walls of said body part to sustain said further part, and means to secure said body and further parts together with said formation so engaged with the coil unit, said further part having an air opening therein and having a further formation spaced outwardly from said opening and said first named formation and positioned to engage said coil unit to at least in part define an air flow path past the latter.

7. Housing structure for the evaporator of an automotive air conditioner or the like, comprising parts fabricated of molded plastic material and coacting to receive coil and blower units of said evaporator, said parts including a housing body part having upright walls within which said coil unit is adapted to be disposed, a cover part having a top panel carrying integral walls fitted to those of said body part and provided with integral depending formations, within its said walls, which formations are predeterminedly positioned to engage said coil unit from above to sustain said cover part, said top panel having an air intake opening formed therein between said formations, a blower housing part connected to a wall of said body part and communicating with the interior thereof through an air opening, and means to secure said body and cover parts together with said formations of the latter so engaging the coil unit.

8. Evaporator housing structure for an automobile air conditioning or like system, comprising an elongated, generally rectangular housing body adapted to receive an evaporator coil and core unit, and an elongated, generally rectangular cover mounted on said housing body, said cover being of a molded plastic composition, having a top panel provided with a downwardly extending peripheral wall and being provided with a plurality of integral formations within said wall depending from said top panel and positioned for bracing engagement with said coil and core unit, including formations located relatively closely adjacent the lengthwise-spaced cover ends, said cover having a pair of air intake openings to the interior of said housing body which are located inwardly of said last named formations.

9. Evaporator housing structure for an automobile air conditioning or like system, comprising an elongated, generally rectangular housing body adapted to receive an evaporator coil and core unit, and an elongated, generally rectangular cover mounted on said housing body, said cover being of a molded plastic composition, having a top panel provided with a downwardly extending peripheral wall and being provided with a plurality of integral formations within said wall depending from said top panel and positioned for bracing engagement with said coil and core unit, including formations located relatively closely adjacent the lengthwise-spaced cover ends and a formation therebetween, said cover having a pair of air intake openings to the interior of said housing body which are located respectively inwardly of said first named formations and between the latter and said last named formation.

10. Evaporator housing structure for an automobile air conditioning or like system, comprising an elongated, generally rectangular housing body adapted to receive an evaporator coil and core unit, and an elongated, generally rectangular cover mounted on said housing body, said cover being of a molded plastic composition, having a top panel provided with a downwardly extending peripheral wall and being provided with a plurality of integral formations within said wall depending from said top panel and positioned for bracing engagement with said coil and core unit, including formations located relatively closely adjacent the lengthwise-spaced cover ends and a formation therebetween, said cover having a pair of air intake openings to the interior of said housing body which are located respectively inwardly of said first named formations and between the latter and said last named formation, said openings being offset transversely in relation to the lengthwise center line of the cover.

11. Housing structure for the evaporator of an automotive air conditioner or the like, comprising parts fabricated of molded plastic material and coacting to receive coil and blower units of said evaporator, said parts including an elongated rectangular housing body part having upright walls within which said coil unit is adapted to be disposed, a cover part having a top panel carrying integral walls fitted to those of said body part and provided with integral depending formations within its said walls, which formations are predeterminedly positioned to engage said coil unit from above to sustain said cover part, said top panel having a pair of air intake openings formed therein between said formations, a pair of blower housing parts connected to opposite end walls of said body part and communicating with the interior thereof through air openings, and means to secure said body and cover parts together with said formations of the latter so engaging the coil unit.

12. Housing structure for the evaporator of an automotive air conditioner or the like, comprising parts fabricated of molded plastic material and coacting to receive coil and blower units of said evaporator, said parts including an elongated rectangular housing body part having upright walls within which said coil unit is adapted to be disposed, a cover part having a top panel carrying integral walls fitted to those of said body part and provided with integral depending formations within its said walls, which formations are predeterminedly positioned to engage said coil unit from above to sustain said cover part, said top panel having a pair of air intake openings formed therein between said formations, a pair of blower housing parts connected to opposite end walls of said body part and communicating with the interior thereof through air openings, and means to secure said body and cover parts together with said formations of the latter so engaging the coil unit, said air intake openings of said cover being offset in relation to a longitudinal center line from end to end of the latter.

13. Housing structure for the evaporator of an automotive air conditioner or the like, comprising parts fabricated of molded plastic material and coacting to receive coil and blower units of said evaporator, said parts including a housing body part having upright walls within which said coil unit is adapted to be disposed, a cover part having a top panel carrying integral walls fitted to those of said body part and provided with integral depending formations within its said walls, which formations are predeterminedly positioned to engage said coil unit from above to sustain said cover part, said top panel having an air intake opening formed therein between said formations, a blower housing part connected to a wall of said body part and communicating with the interior thereof through an air opening, and means to secure said body and cover parts together with said formations of the latter so engaging the coil unit, said body and blower housing parts having means to connect the same for liquid drainage from one to the other at a level beneath said last-named air opening.

14. Housing structure for the evaporator of an automotive air conditioner or the like, comprising parts fabricated of molded plastic material and coacting to receive coil and blower units of said evaporator, said parts including a housing body part having upright walls within which said coil unit is adapted to be disposed, a cover part having a top panel carrying integral walls fitted to those of said body part and provided with integral depending formations within its said walls, which formations are predeterminedly positioned to engage said coil unit from above to sustain said cover part, said top panel having an air intake opening formed therein between said formations, a blower housing part connected to a wall of said body part and communicating with the interior thereof through an air opening, and means to secure said body and cover parts together with said formations of the latter so engaging the coil unit, said body and blower housing parts having means to connect the same for liquid drainage from one to the other at a level beneath said last-named air opening, said blower housing part having means removably securing the same to said body part.

15. Housing structure for the evaporator of an automotive air conditioner or the like, comprising parts fabricated of molded plastic material and coacting to receive coil and blower units of said evaporator, said parts including a housing body part having upright walls within which said coil unit is adapted to be disposed, a cover part having a top panel carrying integral walls fitted to those of said body part and provided with integral depending formations within its said walls, which formations are predeterminedly positioned to engage said coil unit from above to sustain said cover part, said top panel having an air intake opening formed therein between said formations, a blower housing part connected to a wall of said body part and communicating with the interior thereof through an air opening, and means to secure said body and cover parts together with said formations of the latter so engaging the coil unit, said body and blower housing parts having means to connect the same for liquid drainage from one to the other at a level beneath said last-named air opening, said body and blower housing parts being formed integral with one another.

References Cited in the file of this patent

UNITED STATES PATENTS

| | | |
|---|---|---|
| 2,310,843 | Ditzler | Feb. 9, 1943 |
| 2,405,411 | Dybvig | Aug. 6, 1946 |
| 2,485,733 | Hart | Oct. 25, 1949 |
| 2,720,087 | Groene | Oct. 11, 1955 |
| 2,749,725 | Essman | June 12, 1956 |
| 2,751,760 | Williams | June 26, 1956 |
| 2,773,360 | Baker | Dec. 11, 1956 |
| 2,776,554 | Pigman | Jan. 8, 1957 |
| 2,794,330 | Dunn | June 4, 1957 |
| 2,811,023 | Lathrop | Oct. 29, 1957 |